Figure 1:
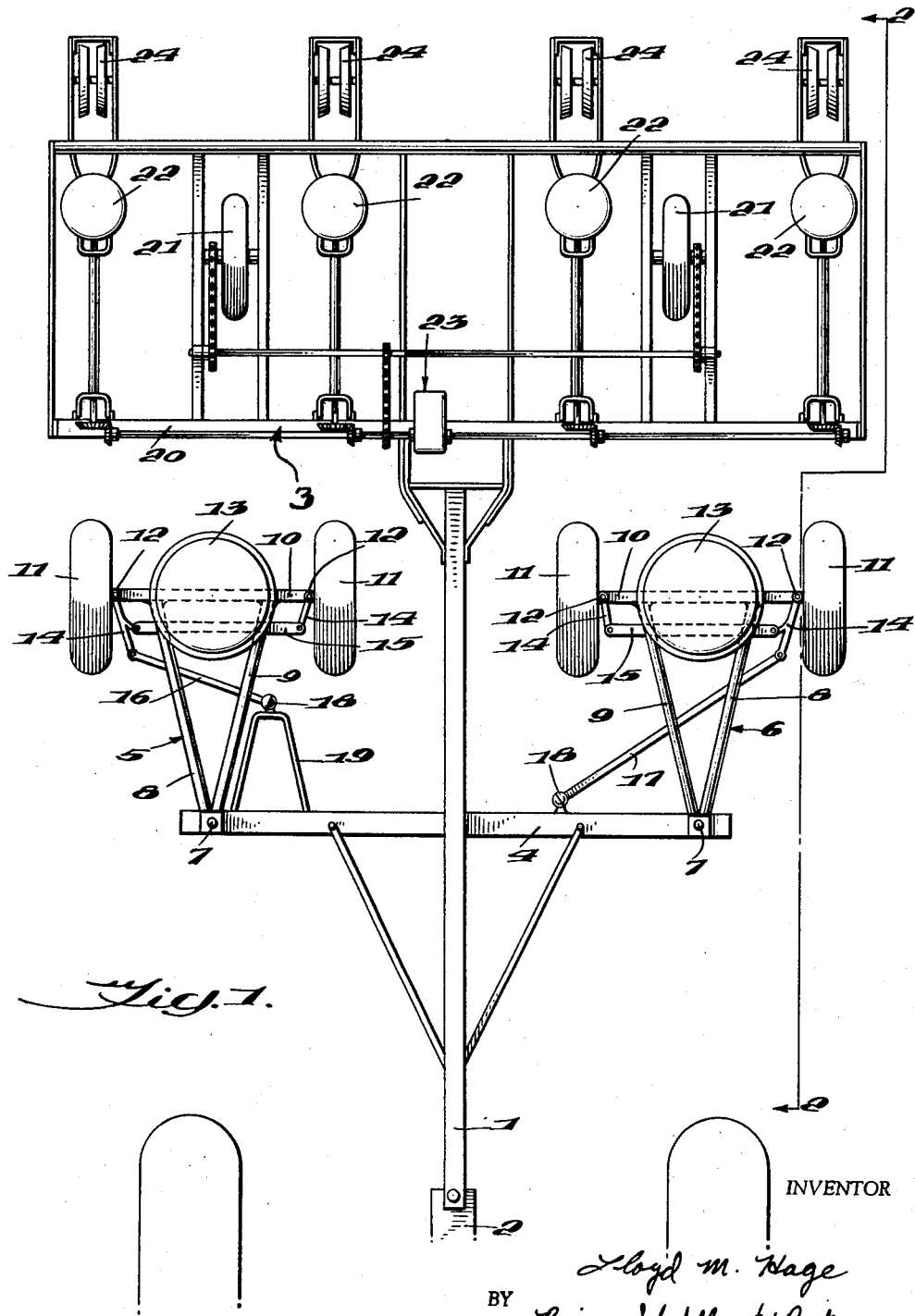

March 29, 1960

L. M. HAGE 2,930,335

CORN PLANTER TRACK ATTACHMENT

Filed April 8, 1957

2 Sheets-Sheet 1

INVENTOR
Lloyd M. Hage
BY Pierce, Scheffler & Parker
ATTORNEYS

March 29, 1960 L. M. HAGE 2,930,335
CORN PLANTER TRACK ATTACHMENT
Filed April 8, 1957 2 Sheets-Sheet 2
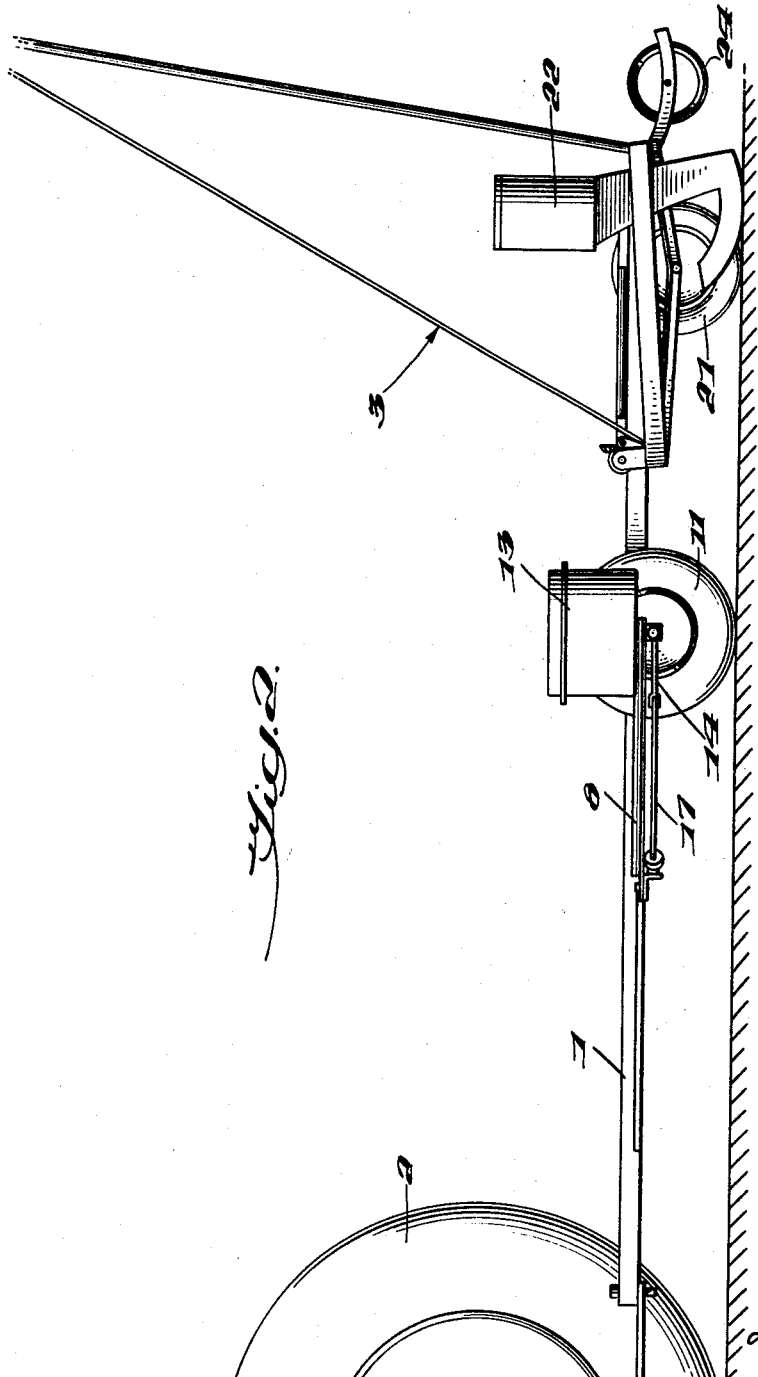
INVENTOR
Lloyd M. Hage
BY
Pierce, Scheffler & Parker
ATTORNEYS

United States Patent Office 2,930,335
Patented Mar. 29, 1960

2,930,335
CORN PLANTER TRACK ATTACHMENT

Lloyd M. Hage, Inwood, Iowa

Application April 8, 1957, Serial No. 651,454

2 Claims. (Cl. 111—52)

This invention relates generally to a track packing attachment for corn planting apparatus, and more particularly to a track packing apparatus having steering means for automatically adjusting the angles of the track packing wheels with respect to the weighted frame upon sharp turning of the equipment and during contour planting.

In the corn planting art it is well known to form a track or furrow in the soil, to drop seeds at spaced intervals along the track, and to close the soil over planted seeds. (See for example the article "Four-Row Wheel Track Planting," pages 34 and 35 of the December 1956 issue of Successful Farming.) It is also broadly old to tow a plurality of laterally spaced individual planting units from a single hitch as shown by the Ratcliff Patent No. 2,346,330.

In accordance with the instant invention a four-wheel track packing attachment is connected between a towing device and a standard four-hopper corn planter so that the weighted wheels will form parallel tracks in the soil in line with the hoppers. The wheels of the track packing attachment are connected by means of a steering linkage in such a manner that movement of the attachment with respect to the towing device during contour planting or during sharp turns will effect an angular adjustment of the wheels with respect to the weighted frame. By the use of the novel apparatus conventional seedbed preparations, such as discing and harrowing are eliminated. The rough, loose soil between the rows formed by the packer reduces erosion and weed-seed germination and hence cuts subsequent cultivation operations. By the four-row planting operation, over-all production costs—such as gasoline, wear and tear on equipment, and man-hours—are considerably reduced.

Thus the primary object of my invention is to provide a track packing attachment for use with standard corn planting equipment, said attachment having steering means for adjusting the angle of the packing wheels with respect to the weighted frame in accordance with movement of the attachment with respect to the towing device.

A more specific object of my invention is to provide a four-wheeled track packing apparatus having a plurality of two-wheeled units pivotally connected to a common transverse hitching bar and means connecting the wheels of each unit to the hitching bar so that pivotal movement of the units with respect to the bar will effect an angular adjustment of the packing wheel.

Other objects and advantages of my invention will become more apparent from a study of the following specification when considered in conjunction with the accompanying drawings in which:

Fig. 1 is a plan view of the invention showing two embodiments of my track packing device in combination with a standard corn planting apparatus; and Fig. 2 is a side elevational view of the apparatus taken along line 2—2 of Fig. 1.

Referring now to the drawings, a longitudinal draw bar 1 is pivotally secured at its forward end to a tractor 2 or other suitable piece of farm towing equipment and at its rear end is rigidly connected to and supported by a standard corn planting apparatus indicated generally by the reference numeral 3.

Transverse bar 4 is rigidly secured to the draw bar 1 intermediate its ends and provides means for towing the track packing devices indicated generally by the reference numerals 5 and 6 which are pivotally connected to the transverse bar 4 by pivot means 7. Each of the track packing devices consists of rigid triangular frame formed by angular side members 8, 9 welded to axle 10 which is normally parallel to the transverse bar 4. Wheels 11 are rotatably mounted upon the steering knuckle spindles of the steering knuckles 12. While it is preferred to utilize resilient-tire wheels of standard size on the packing device, it is of course also possible to use metal or other wheels having smooth or irregular traction surfaces. Rigidly supported on the axles of the packing device are suitable weight members 13, such as barrels of solid concrete, crushed rock, or the like.

It is contemplated that each of the weight members should have a weight of approximately 500 to 1000 pounds, as will be further explained below.

According to the instant invention, means are provided for accurately steering the wheels of the track packing devices so that proper tracks will be formed when the apparatus is utilized on contour as well as level planting. In both of the embodiments illustrated in Fig. 1 of the drawing, the steering knuckle arms 14 are connected by means of tie rods 15 so that the wheels at either end of the axles will be simultaneously pivotable about their respective steering knuckles. Drag links 16, 17 are connected at one end to the steering knuckle arms and at the other end to the transverse bar 4. Thus as the track packing devices 5 and 6 pivotally turn about the horizontal or vertical axes of pivots 7 on the transverse bar 4, the angles of the wheels 11 with respect to the axles 10 will be altered accordingly.

In the right hand track packing embodiment 6 of Fig. 1 the drag link 17 is connected to the transverse bar 4 by pivot 18 secured directly to the transverse bar. In the preferred track packing embodiment 5 illustrated on the left hand side of the longitudinal bar 1 in Fig. 1, the drag link 16 is connected to a pivot 18 which is rearwardly offset in the horizontal plane from the transverse bar 4 by means of the rigid angle iron support 19 welded thereto. This arrangement serves to reduce the length and angle of the drag link and provide improved operation with the minimization of undesirable vibration.

The standard corn planting apparatus indicated generally by the reference numeral 3 includes a rigid frame 20 secured to the longitudinal bar 1 and supported by wheels 21. Seed hoppers 22 are spaced laterally of the central longitudinal axis of the apparatus in longitudinal alignment with the packing wheels 11. The seed discharge of hoppers 22 is automatically controlled by gearing means 23 driven by the supporting wheels 21. Track closing means 24 are secured to frame 20 longitudinally behind the hoppers 22 and serve to close the furrows after the seed has been placed therein.

The operation of the apparatus may now be readily described.

For planting corn on dry or wet ground, which may or may not be freshly plowed as desired, the device is towed by the tractor so that parallel tracks are formed by wheels 11 having a depth of approximately two inches, depending on the weight of members 13. Trailing directly behind the packing wheels 11 are the automatically operable seed hoppers 22 and the track closure means 24. During contour operation of the device one wheel of each of the two-wheel units 5, 6 will be lower than the corresponding wheel on the unit and the angles of the wheels 11 with respect to the axles 10 will be automatically adjusted to the desired angle by the steering linkage. Thus the weighted two-wheel units will firmly contact the ground and serve to steady the entire apparatus. Similarly, during sharp turning of the apparatus at the end of the rows, the automatic adjustment of the wheels 11 of the weighted units will serve to steady the equipment and prevent undue strain on the towing connections.

It should be mentioned that the pivot means 7 are of a type—such as a ball and socket connection—which will allow pivotal movement of the two-wheeled units 5 and 6 about both the vertical and horizontal axes.

The simple, rugged construction of the packing device of my invention is relatively inexpensive to manufacture, economical to service, and easy to repair. Standard pneumatic tires are all that are necessary to accomplish satisfactory parallel-track packing.

While in accordance with the provisions of the statutes I have illustrated and described the best form of embodiments of my invention known to me, it will be apparent to those skilled in the art that changes may be made in the form of the apparatus described without departing from the spirit of my invention as set forth in the appended claims.

What I claim is:

1. A contour planting apparatus comprising a main frame adapted to be towed at its forward end by a towing device, laterally spaced seed hoppers secured to said main frame, a track packing means for forming tracks into which the seeds are deposited from said hoppers comprising at least one rigid weighted frame pivotally connected to said main frame intermediate its forward end and said seed hoppers, the pivotal connection between the weighted frame and the main frame providing pivotal movement about both horizontal and vertical pivot axes, said weighted frame having an axle and steering knuckles pivotally connected about substantially vertical pivot axes to the ends of said axle, each of said steering knuckles having arm and spindle portions, track packing wheels rotatably mounted upon the spindles of said steering knuckles for supporting said weighted frame, said track packing wheels being rotatable about a horizontal axis normally transverse to the direction of travel of said apparatus, each of said packing wheels being longitudinally aligned, respectively, with one of the seed hoppers, and steering means connecting the steering knuckles to said main frame to cause the angles of the wheels with respect to the axle of said weighted frame to be varied in accordance with pivotal movement of said weighted frame with respect to said main frame comprising a tie rod connecting the arms of the steering knuckles to each other, and a drag link connecting one of the steering knuckle arms to said main frame.

2. Apparatus as defined in claim 1 wherein an equal number of said weighted frames are pivotally connected to said main frame on each side of the longitudinal central axis thereof to provide lateral stability to said main frame during the contour planting operation.

References Cited in the file of this patent

UNITED STATES PATENTS

| | | |
|---|---|---|
| 818,105 | Meredith | Apr. 17, 1906 |
| 1,282,124 | Phillips | Oct. 22, 1918 |
| 1,371,012 | Williams | Mar. 8, 1921 |
| 2,100,447 | Mahaffey | Nov. 30, 1937 |
| 2,368,134 | Haas | Jan. 30, 1945 |
| 2,370,468 | Hyland | Feb. 27, 1945 |
| 2,376,464 | White | May 22, 1945 |
| 2,533,553 | Burns | Dec. 12, 1950 |